US011292032B2

(12) United States Patent
Persson et al.

(10) Patent No.: US 11,292,032 B2
(45) Date of Patent: Apr. 5, 2022

(54) LINING ARRANGEMENT, AND A METHOD FOR FASTENING LINING ELEMENTS TO A SUPPORT STRUCTURE

(71) Applicant: Metso Sweden AB, Trelleborg (SE)

(72) Inventors: Mathias Persson, Trelleborg (SE); Peter Lundberg, Claremont (AU)

(73) Assignee: Metso Sweden AB, Trelleborg (SE)

( * ) Notice: Subject to any disclaimer, the term of this patent is extended or adjusted under 35 U.S.C. 154(b) by 0 days.

(21) Appl. No.: 17/175,884

(22) Filed: Feb. 15, 2021

(65) Prior Publication Data
US 2021/0162464 A1    Jun. 3, 2021

Related U.S. Application Data

(62) Division of application No. 16/333,051, filed as application No. PCT/EP2017/073325 on Sep. 15, 2017, now Pat. No. 10,953,438.

(30) Foreign Application Priority Data

Sep. 16, 2016 (EP) ..................... 16189247
May 20, 2017 (EP) ..................... 17172104

(51) Int. Cl.
*F16B 5/02* (2006.01)
*F16B 23/00* (2006.01)
(Continued)

(52) U.S. Cl.
CPC ............ *B07B 1/4645* (2013.01); *B25B 13/48* (2013.01); *B25B 13/50* (2013.01); *F16B 5/02* (2013.01);
(Continued)

(58) Field of Classification Search
CPC ..... B07B 1/4645; B07B 1/46; B07B 2201/02; B25B 13/50; B25B 13/48; F16B 5/02;
(Continued)

(56) References Cited

U.S. PATENT DOCUMENTS 3,354,757 A * 11/1967 Grimm ................... B25B 13/04
                                                                  81/176.1
6,036,419 A *  3/2000 Lanham .............. F16B 23/0061
                                                                  301/35.621
(Continued)

FOREIGN PATENT DOCUMENTS

CN    202056160    * 11/2011    .............. F16B 39/10
CN    103671394        3/2014
(Continued)

OTHER PUBLICATIONS

International Search Report and Written Opinion for International Application No. PCT/EP2017/073325 dated Jan. 3, 2018.
(Continued)

*Primary Examiner* — Bayan Salone
(74) *Attorney, Agent, or Firm* — Andrus Intellectual Property Law, LLP

(57) ABSTRACT

The disclosure relates to a lining arrangement for wear protection comprising: at least one lining element arranged to be fastened to a support structure; and at least one device, the device comprising: a first element adapted to be received in a through hole of said at least one lining element or a through hole created by adjacent lining elements, the first element having an axially arranged opening; a second element for engagement with the first element, such that the at least one lining element is attached to the support structure upon interconnection between the first element and the second element, and wherein an outer periphery of the second element comprises a plurality of grooves for engagement with a handling tool. The disclosure further relates to a method for fastening lining elements to a support structure.

14 Claims, 7 Drawing Sheets

(51) Int. Cl.
*F16B 33/00* (2006.01)
*F16B 37/12* (2006.01)
*B07B 1/46* (2006.01)
*B25B 13/48* (2006.01)
*B25B 13/50* (2006.01)

(52) U.S. Cl.
CPC ........ *F16B 5/0241* (2013.01); *F16B 23/0061* (2013.01); *F16B 33/006* (2013.01); *F16B 37/125* (2013.01); *B07B 2201/02* (2013.01)

(58) Field of Classification Search
CPC .. F16B 5/0241; F16B 23/0061; F16B 33/006; F16B 37/125
See application file for complete search history.

(56) References Cited

U.S. PATENT DOCUMENTS

| | | | | |
|---|---|---|---|---|
| 6,082,646 | A * | 7/2000 | Clarke | B02C 17/22 241/182 |
| 6,206,200 | B1 * | 3/2001 | Gilles | F16B 19/1081 209/399 |
| 7,240,801 | B2 * | 7/2007 | Freissle | B07B 1/46 209/405 |
| 7,877,948 | B2 * | 2/2011 | Davies | B65D 90/043 52/506.05 |
| 9,644,657 | B2 * | 5/2017 | Pham | B23P 11/00 |
| 10,953,438 | B2 * | 3/2021 | Persson | F16B 23/0061 |
| 2003/0012833 | A1 * | 1/2003 | Freissle | B07B 1/4645 425/1 |
| 2005/0040083 | A1 * | 2/2005 | Freissle | B07B 1/4645 209/1 |
| 2007/0258791 | A1 * | 11/2007 | Davies | B60R 13/01 411/397 |

FOREIGN PATENT DOCUMENTS

| | | | | |
|---|---|---|---|---|
| CN | 104564990 | | 4/2015 | |
| CN | 205478763 | * | 8/2016 | ............. F16B 13/06 |
| DE | 2803711 | | 8/1979 | |
| DE | 2803711 A1 | * | 8/1979 | ............ F16B 13/066 |
| GB | 593 440 A | | 10/1947 | |
| GB | 593440 A | * | 10/1947 | ............. F16B 39/10 |
| JP | 2015078753 | * | 4/2015 | ............ B25B 13/50 |
| SU | 542571 | | 1/1977 | |
| SU | 542571 A1 | * | 1/1977 | |
| SU | 704671 | | 12/1979 | |
| SU | 704671 A1 | * | 12/1979 | |
| UA | 99915 | | 10/2012 | |
| WO | 0053343 A1 | | 9/2000 | |
| WO | 2004043652 A2 | | 5/2004 | |
| WO | WO-2004043652 A2 | * | 5/2004 | ............ B25B 13/50 |
| WO | 2010028442 A1 | | 3/2010 | |
| WO | WO-2010028442 A1 | * | 3/2010 | .......... B07B 1/4645 |
| WO | 2018050842 A1 | | 3/2018 | |

OTHER PUBLICATIONS

International Report on Patentability for International Application No. PCT/EP2017/073325 dated Aug. 28, 2018.
Extended European Search Report for European Patent Application No. 17172104.6 dated Jan. 5, 2018.
Communication for European Application No. 21088729 dated Oct. 23, 2019.
Extended European Search Report for European Application No. 21088729 dated May 1, 2018.
Office Action issued in corresponding Chilean Application No. 679-2019 dated Jan. 9, 2020.
Office Action for corresponding European Patent Application No. 17765466.2, dated Apr. 30, 2020.
Acceptance Decision corresponding to Russian Patent Application No. 2019109080/03, dated Dec. 1, 2020.
Examination Report for corresponding Indian Patent Application No. 201917011787 dated Feb. 2, 2021.
Office Action for corresponding Indonesian Patent Application No. PID201903040 dated Dec. 18, 2020.
Office Action and Search Report for corresponding Chinese Application No. 2017800573217 dated Jun. 1, 2021.

* cited by examiner

LINING ARRANGEMENT, AND A METHOD FOR FASTENING LINING ELEMENTS TO A SUPPORT STRUCTURE

CROSS-REFERENCE TO RELATED APPLICATIONS

This application is a divisional of U.S. patent application Ser. No. 16/333,051, filed Mar. 13, 2019 and now U.S. Pat. No. 10,953,438, which claims priority to PCT/EP2017/073325, filed Sep. 15, 2017, which published in English on Mar. 22, 2018 as publication number WO 2018/050845, which claims priority to European Application No. 17172104.6, filed May 20, 2017, and European Application No. 16189247.6, filed Sep. 16, 2016, incorporated herein by reference.

TECHNICAL FIELD

The disclosure relates to a lining arrangement and a method for fastening lining elements to a support structure.

BACKGROUND ART

Lining arrangements are used to protect surfaces and/or structures in machines which, during operation thereof, is exposed to a significant level of wear from material handled by the machines. Such machines typically handle materials such as sand, gravel, stone, ore etc. which, with or without water being added, cause significant wear on exposed surfaces over which the material moves. To prolong the service life of the exposed surfaces, these are coated with wear-resistant lining elements of wear resistant material. Typically, such wear resistant lining materials are an elastomeric material, some type of ceramic or a combination thereof. The lining elements provide wear protection to, among other things, chutes, drums, bins, feeders, feed hoppers, transshipment places and vehicle platforms, such as truck haul bodies, in the stone-working, mining, aggregates, and installation industry. Due to the large number of different applications where wear linings are used as wear protection, the wear linings are often manufactured to allow adjustment and cutting to suit a certain type and shape of surface. It is important that the wear lining be well fastened to the support surface so that it remains in place when subjected to vibrations, shocks and impacts. In many cases it is also desirable to be able to quickly exchange the wear lining as it starts to be worn out.

Conventional fastening methods typically rely on fastening the lining elements using fastening elements that are arranged to clamp the lining elements to the supporting structure by means of one or more conventional bolts, such as through bolts. A drawback of these systems is that securing and unsecuring the bolts may be time-consuming and awkward, hence increasing the down time of the machines. A further problem with fastening devices according to prior art is that they require a substantive amount of force and that the service personnel is exposed to high risk of injury when attaching the lining elements.

SUMMARY OF THE INVENTION

It is an objective of the present invention to provide an improvement of the above technique and prior art. More particularly, it is an objective of this invention to provide an improved lining arrangement and a method for easy fastening of lining elements to a supporting structure in convenient and reliable manner.

According to a first aspect, there is provided a lining arrangement for wear protection comprising at least one lining element arranged to be fastened to a support structure, and at least one device, said device comprising: a first element adapted to be received in a through hole of said at least one lining element or a through hole created by adjacent lining elements; a second element for engagement with said first element, such that said at least one lining element is attached to said support structure upon interconnection between said first element and said second element, and wherein an outer periphery of said second element comprises a plurality of grooves for engagement with a handling tool.

This may be advantageous as it provides an improved lining arrangement which allows for a more easy and fast mantling and dismantling of individual lining elements on the supporting structure. With the handling tool, maintenance personnel may remove the second element from the first element faster and more convenient than would be the case for a conventional lining arrangement. This is further advantageous in that the most hazardous stage of the fastening process will be removed. There is no longer a need to use a hammer in order to force the individual lining elements in place. Instead, a screwing tool is used to fasten the lining elements to the support structure by engaging the second element with the first element.

The first element may be attached to the support structure in different ways. According to some embodiments, the first element is adapted to engage with the lining element(s) and the support structure, and when the second element is engaged with the first element, the lining element(s) is attached to the support structure. According to alternative embodiments, the first element is adapted to be attached to the support structure before engagement with the lining element and the second element. The first element may be attached by means of welding or by fastening by means of a bolt and a nut.

According to some embodiment, the grooves extends in an axial direction and along at least a portion of the length of the second element.

According to some embodiments, the grooves extends in an axial direction and along the entire length of said second element.

According to some embodiments, the grooves extend in an axial direction and along a limited portion of the length of said second element.

According to some embodiments, each lining element comprises at least one through hole, said through hole having a first circumference along a first portion of its axial direction and a second circumference along a second portion of its axial direction, said second circumference being smaller than said first circumference. Thus, in one embodiment, an abutment surface is formed in the transition between the first and the second portion of the through hole.

According to some embodiments, the said circumference surface of adjacent lining elements has shapes which create at least one opening, said at least one opening having a first circumference along a first portion of its axial direction and a second circumference along a second portion of its axial direction, said second circumference being smaller than said first circumference.

According to some embodiments, the first element comprises a sleeve member having a flange with a radial extension arranged in a first end thereof.

According to some embodiments, the first element is manufactured in a flexible and deformable material, and preferably chosen from the group consisting of thermoplastic material or polyurethane or combinations thereof.

According to some embodiments, the first element is arranged to expand in a radial direction upon engagement with said second element.

According to some embodiments, the first element has slit openings arranged in a longitudinal extension in a second end opposite said first end.

According to some embodiments, the second element is manufactured in a material chosen from the group consisting of ceramic material, steel, or rigid plastic.

According to some embodiments, the first element has an outer threading, and said second element is adapted for engagement with said threading of said first element.

According to some embodiments, the axially arranged opening of said first element is adapted to receive a bolt for attachment to said support structure by means of said bolt and a nut.

According to some embodiments, the said first element is manufactured by a material chosen from the group consisting of ceramic material, steel, or rigid plastic.

According to some embodiments, the second element is manufactured by a thermoplastic material or a polyurethane or combinations thereof.

According to some embodiments, the second element comprises a core and an outer shell, wherein the core is relatively softer than the outer shell.

According to some embodiments, the threading of said first element is arranged to cut into said core of the second element when said second element is threaded onto the first element.

According to some embodiments, an inner periphery of said at least one through hole comprises a protrusion for engagement with the outer periphery and/or the bottom portion of said second element.

According to a second aspect of the invention, these and other objects are achieved, in full or at least in part, by a method for fastening lining elements to a support structure. The method comprises placing an opening of a lining element or an opening created by adjacent lining elements above a fastening position of a support structure, said opening having a first circumference along a first portion and a second circumference along a second portion of its axial direction; engaging a first element with said support structure; and engaging a second element with said first element by engaging a handling tool with a plurality of grooves provided on an outer periphery of said second element, and creating a screwing motion of said second element, thereby attaching said lining element or lining elements to said support structure.

According to one embodiment of this second aspect, the step of placing an opening of said lining element or an opening created by adjacent lining elements above a fastening position of said support structure is performed before engaging said first element with said support structure, and thereafter engaging the second element with said first element.

According to another embodiment of this second aspect, the step of engaging said first element with said support structure, is performed before placing an opening of said lining element or an opening created by adjacent lining elements above a fastening position of said support structure and thereafter engaging the second element with said first element.

Effects and features of the second aspect are largely analogous to those described above in connection with the first aspect.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

As used herein, the expression "adapted to be received" in for example the phrase: "a first element adapted to be received in a through hole", means that at least a part of said first element is adapted to be spatially positioned within the through hole.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals may be used for similar elements, and wherein:

FIGS. 1 *a-c* show an embodiment of a second element.

DETAILED DESCRIPTION

Figure 1A:
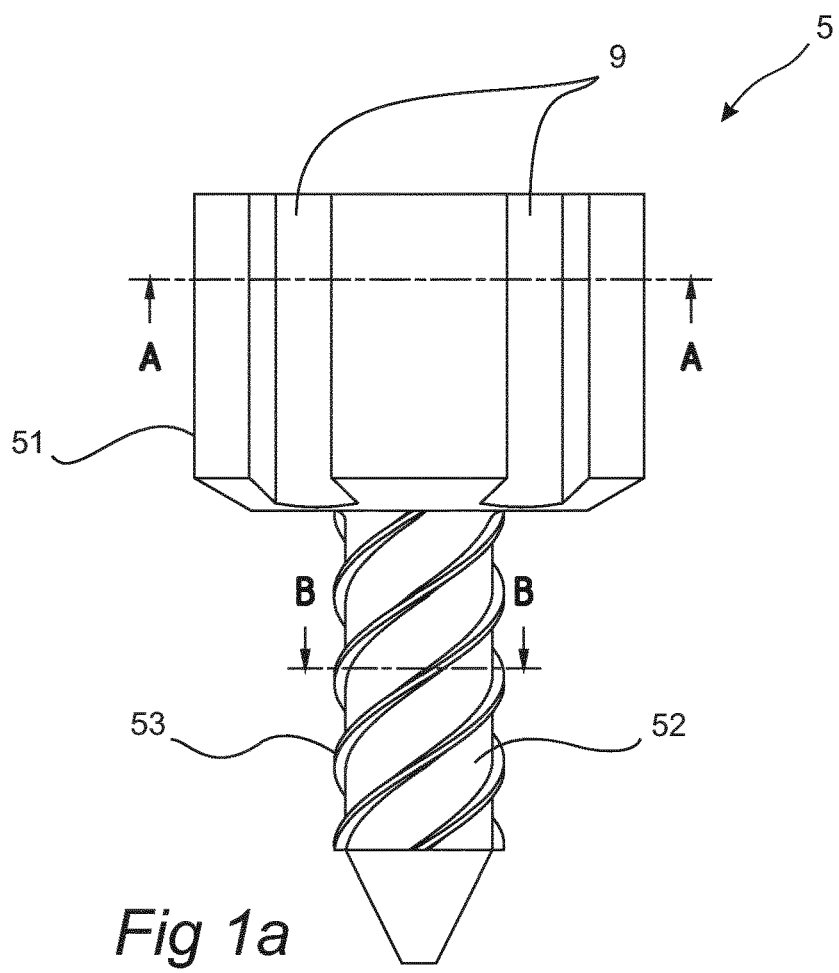
FIG. 1*a* shows a side view.

FIGS. 2*a-b*, and 3*a-b* illustrate a lining arrangement 3 with different parts included in a device that is used to fasten lining elements 1 to a support structure 2 according to one exemplary embodiment. The lining elements 1 are typically used for machines having surfaces exposed to wear, such as for example feeders, chutes, bins, silos, drums, truck haul bodies etc. Thus, the supporting structure 2 may be a support surface of such a machine. Alternatively, the support structure 2 may be a frame, grid, or the like. The fastening device primarily includes a first element 4 and a second element 5.

The lining element 1 has a through hole 8, which has a first circumference along a first portion 81 of its axial extension and a second circumference along a second portion 82 of its axial extension. Thus, in the transition between the first portion 81 and the second portion 82 an abutment surface 83 is formed. The lining element 1 is positioned on a support surface 20 with an aligning of a fastening position on the support surface 20 and the through hole 8.

The first element 4 is positioned and received in the through hole 8. The first element comprises a sleeve member having an axially arranged opening 41, a flange 42 arranged in a first end 44 thereof, and slit openings 43 arranged in a longitudinal extension in a second end 45 opposite the first end 44. When the first element 4 is positioned and received in the through hole 8, the lower surface of the flange 42 is arranged to rest on the abutment surface 83.

Figure 2A:
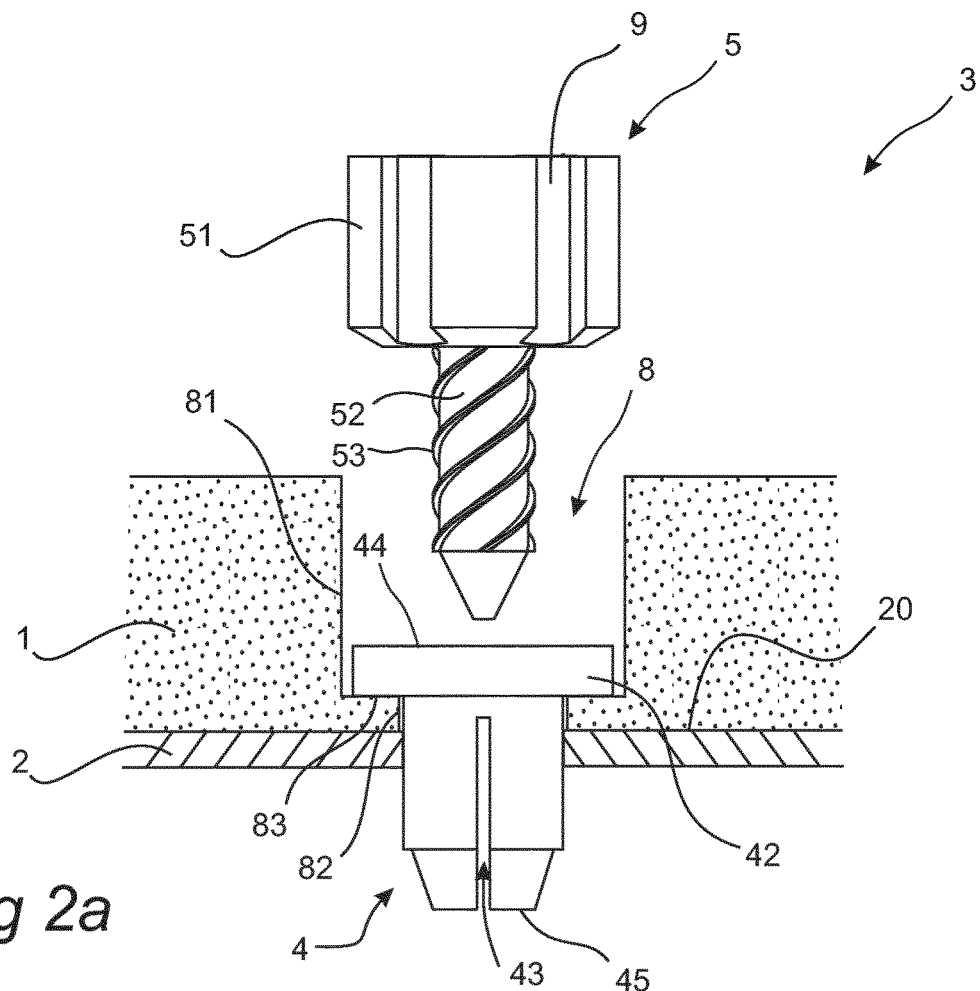
FIGS. 2*a-b* illustrate a sequence of steps of a fastening method according to one exemplary embodiment of the invention.
Figure 2B:
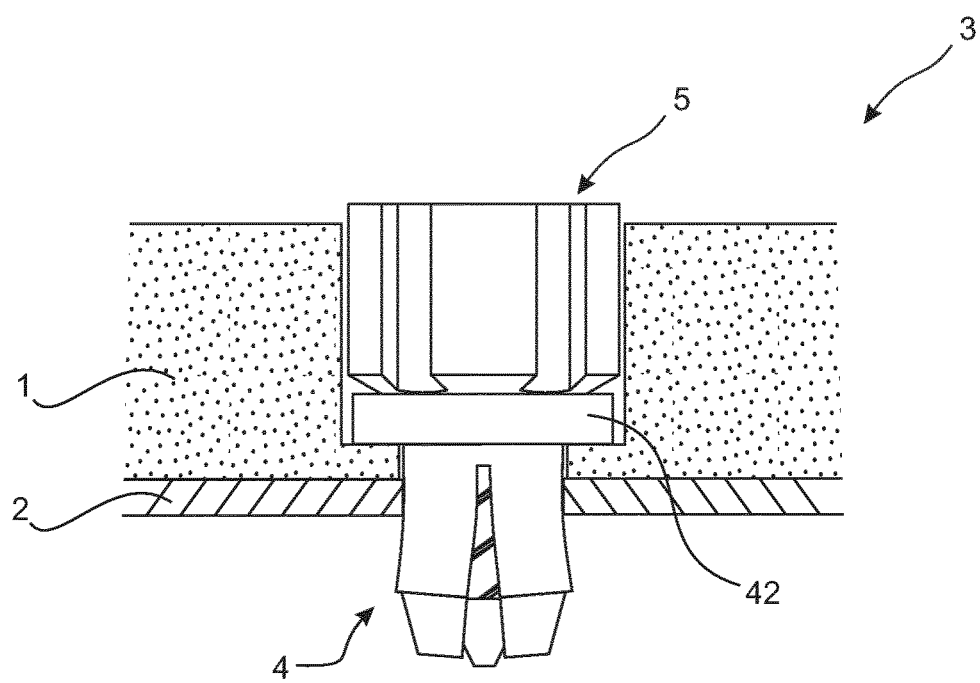
Figure 3A:
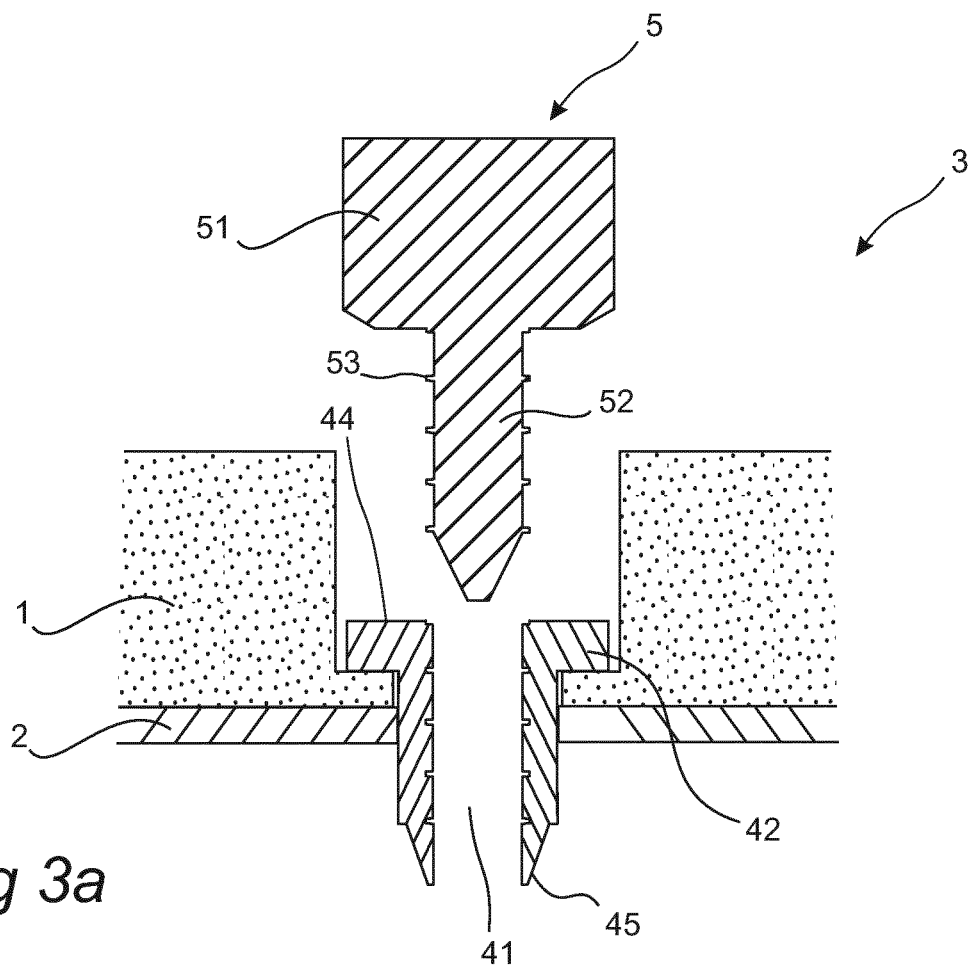
FIGS. 3*a-b* illustrate a cross-sectional view of FIGS. 2*a-b*.
Figure 3B:
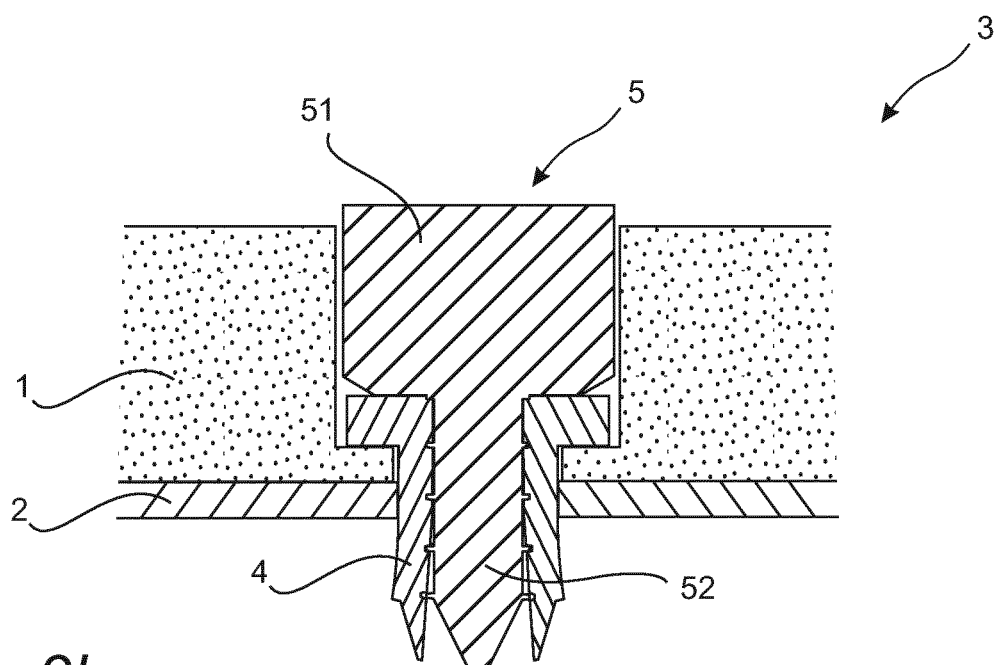

Thereafter the second element 5 is positioned and arranged to engage with the first element 4 and will be screwed into the first element 4 so that the first element 4 expands in a radial direction and locks the lining element 1 in place on the support structure 2, see FIGS. 2b and 3b.

Figure 1B:
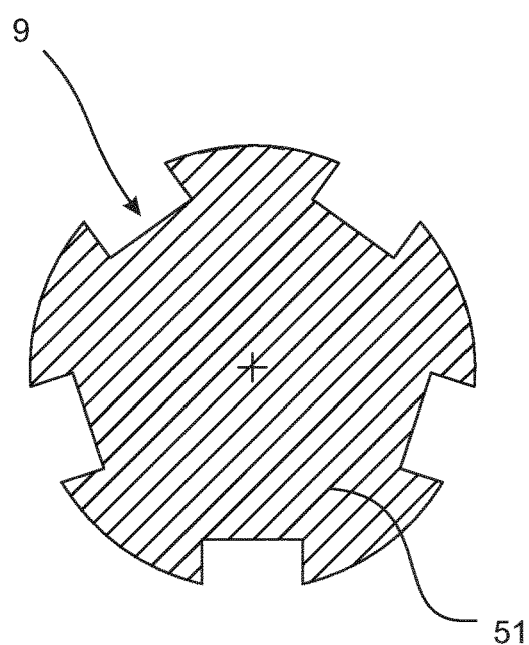
FIG. 1*b* shows a cross-sectional along line A-A.
Figure 1C:
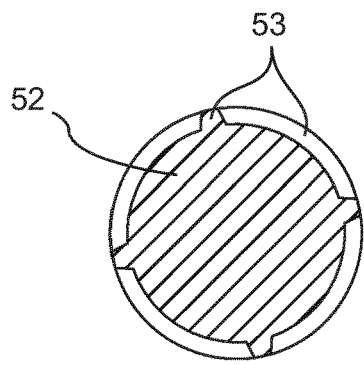
FIG. 1*c* shows a cross-sectional view along line B-B.
Figure 4:
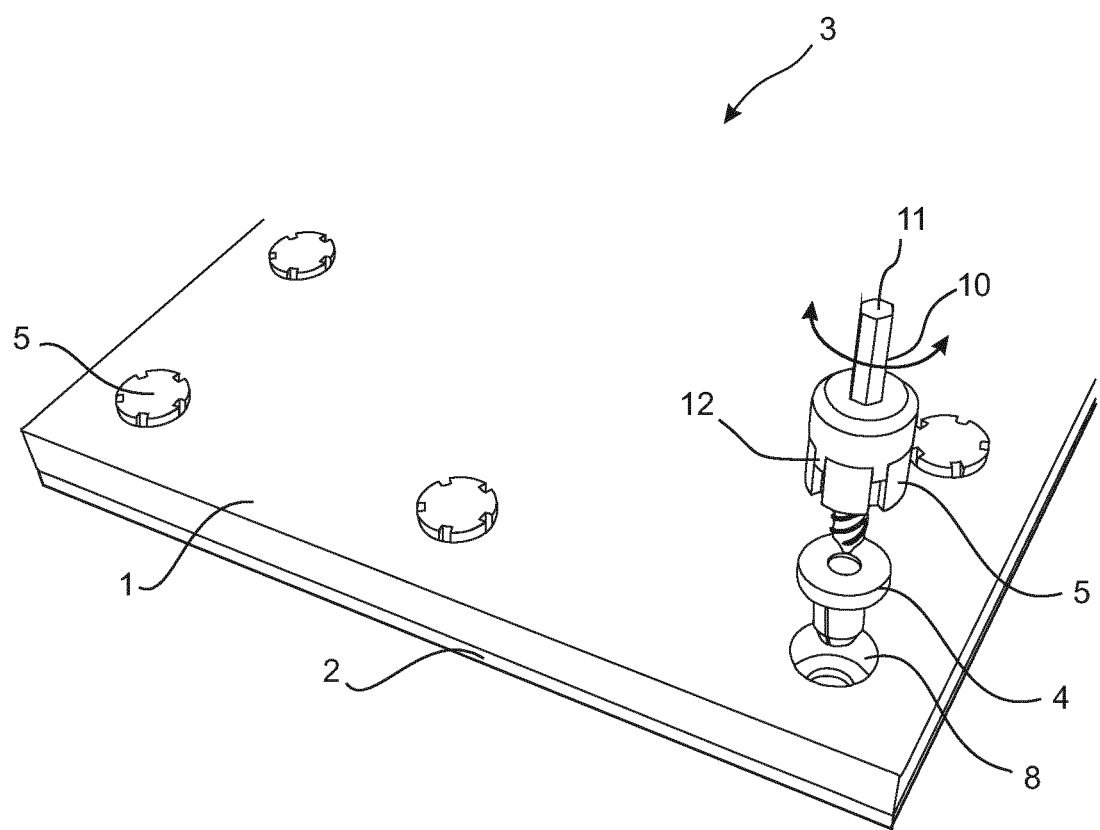
FIG. 4 shows a lining arrangement according to one embodiment.

FIGS. 1a-c show an embodiment of the second element 5. The second element 5 comprises a first portion 51 and a second portion 52. The first portion 51 has spaced apart grooves 9 on its outer periphery and the grooves 9 extends from the top portion of the first portion 51 to the bottom portion of the first portion 51 in an axial direction along the entire length of the first portion 51. The grooves 9 are used during fastening and unfastening of the second element to the first element 4, which may be done by means of a handling tool 10 (see FIGS. 4, and 5c-d). As seen in FIGS. 4, and 5c-d, the handling tool 10 has a shaft 11 and a bottom section that is annular and comprises spaced apart protrusions 12 on its bottom portion. The protrusions 12 are configured to correspond with the grooves 9 provided on the outer periphery of the second element 5. If the grooves 9 are clogged with material, such as fines or similar, the protrusions can push material deeper into the grooves 9 to get in contact with the grooves 9 of the second element 5. A main advantage of the present invention is that even though second element 5 is subjected to heavy wear during use, the handling tool 10 can still be used to remove it. This since the grooves 9 extend the whole, or at least along a substantial part of the height of the first portion 51 of the second element 5.

Referring to the embodiment shown in FIGS. 1a-c, FIGS. 2a-b, and FIGS. 3a-b, a second portion 52 of the second element 5 has an outer threading 53 for engagement with the axially arranged opening 41 of the first element 4. In this embodiment the first element 4 is preferably manufactured by a somewhat flexible or deformable material and can preferably be split into two or more parts by for example the shown slit openings 43. The second element 5 is preferably manufactured in a hard, more rigid material that is strong enough to deform the relatively softer material of the first element 4.

In alternative embodiments, there is threading on both of the two elements 4, 5, but there may be a threading on only one of the two elements 4, 5. If there is an inner threading on the first element 4, the second element 5 will be screwed into the first element 4 and deform in accordance with the inner threading of the same, thereby creating a locking interconnection between the two elements 4, 5. If there is an outer threading on the second element 5, it will be screwed into the first element 4 so that the first element 4 is deformed in accordance with the outer threading of the second element 5, thereby creating a locking interconnection between the two elements 4, 5. The choice of materials is done such that the element 4, 5 having threading thereon is normally harder than the element 4, 5, being deformed by the threading.

In another alternative embodiment, both elements 4, 5 have a respective threading but not in a continuous manner Instead, the respective threading will be spaced apart in corresponding intervals in the circumferential direction of the elements 4, 5. This means that in a given mutual position of the first and second elements 4, 5, the second element 5 can move vertically downwards inside the first element 4 until it comes to a stop near the bottom of the first element 4. Then, the second element 5 is rotated such that the threaded parts of first and second element 4, 5 come into connection with each other and the second element 5 is moved further into the first element 4 and they become interlocked.

FIG. 4 shows a lining arrangement 3 with a couple of devices each comprising a first and second element 4, 5 according to the embodiment of FIGS. 1a-b, 2a-b and 3a-b arranged and fastened to a support structure 2, and one device is shown as about to be positioned and screwed in place.

Figure 5A:
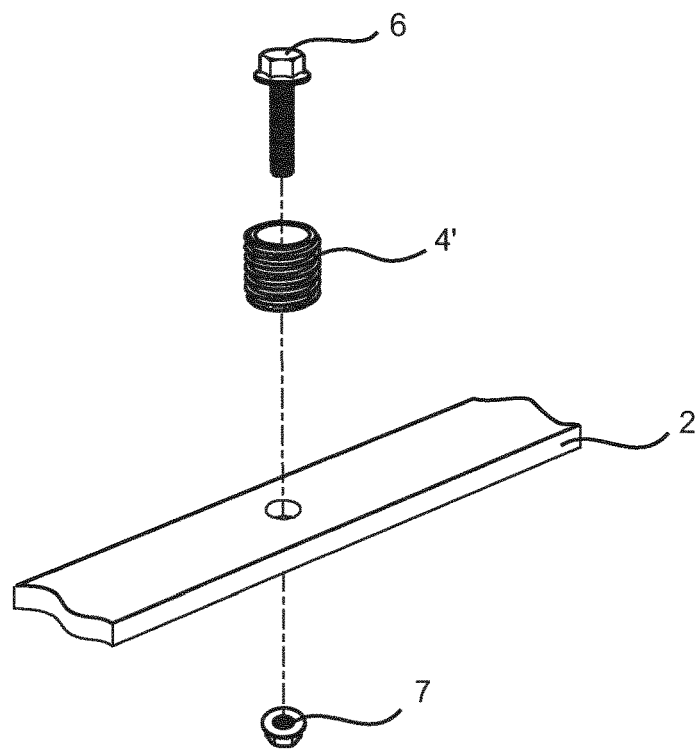
FIGS. 5*a-d* illustrate a sequence of steps of a fastening method according to one exemplary embodiment of the invention.
Figure 5B:
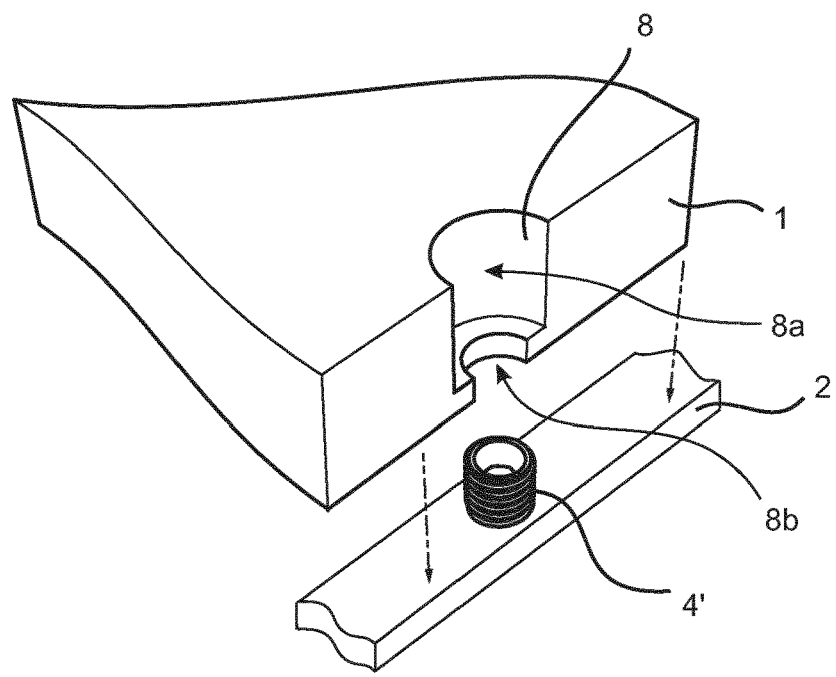
Figure 5C:
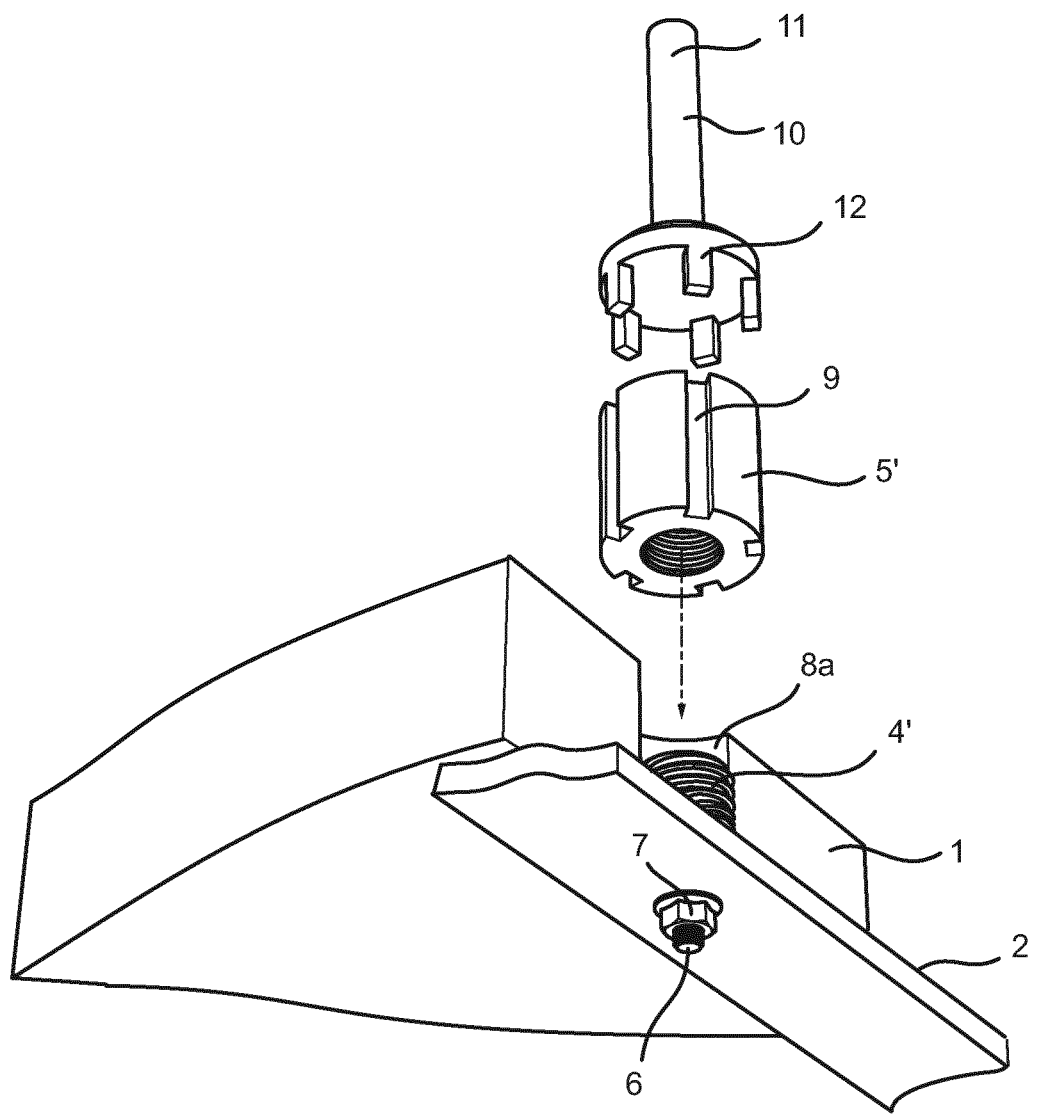
Figure 5D:
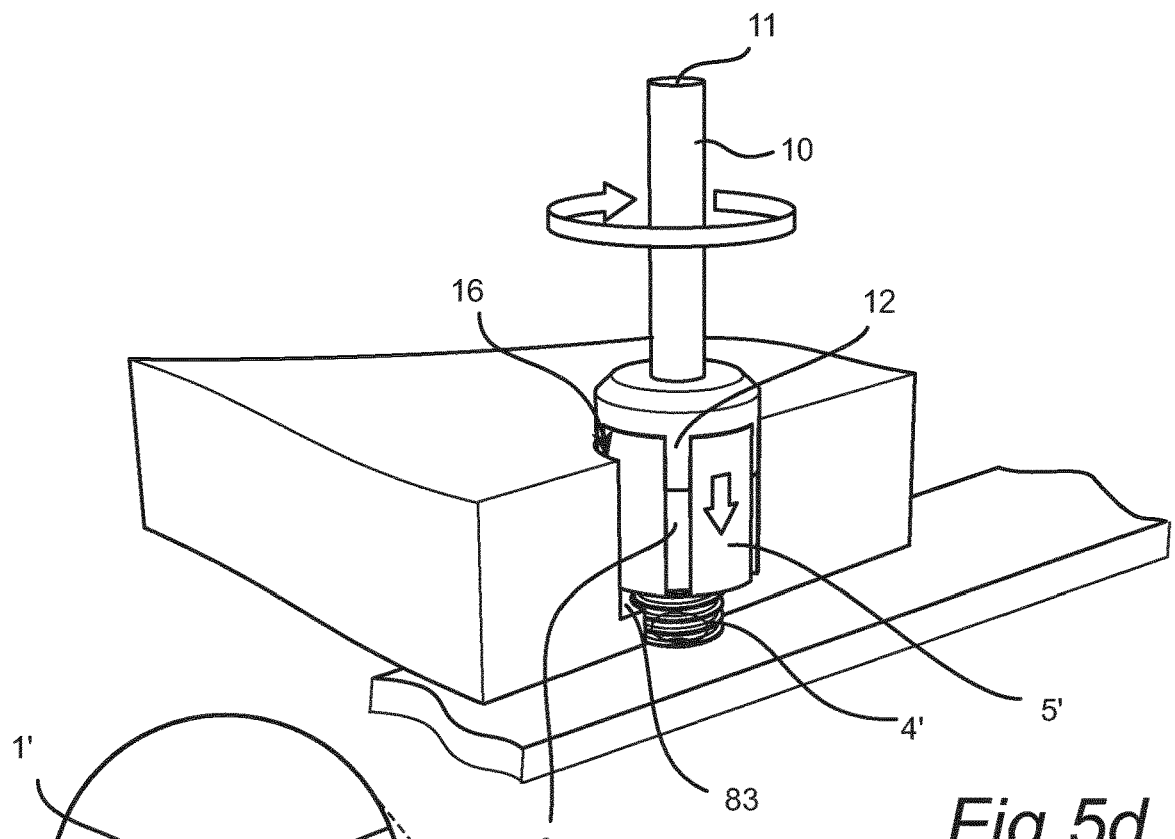

In FIGS. 5a-e illustrates another embodiment of the disclosed lining arrangement 3'. FIG. 5a illustrates a first element 4' which is attached to the support structure 2 by means of a bolt 6 and a nut 7. The first element 4' has an outer threading and is hollow so that the bolt 6 can be inserted into the same, further through the support structure 2, and be attached from below to the support structure 2 by means of the nut 7. The first element 4' is adapted to be received in a though hole 8 of the lining element 1 or a through hole 8 created by adjacent lining elements 1 that are to be fastened to the support structure 2. The first element 4' of this embodiment is preferably manufactured by a hard material such as a ceramic material, steel, or a rigid plastic material.

The second element 5', as shown in FIGS. 5c and 5d is also annular and has an inner threading for engagement with the outer threading of the first element 4' in order to attach the lining element(s) 1 to the support structure 2. The second element 5' has spaced apart grooves 9 on its outer periphery and is preferably manufactured by a thermoplastic material. The grooves 9 extend from the top portion of the second element 5' to the bottom portion of the second element 5' in the axial direction along its entire length. The grooves 9 are used during fastening or unfastening of the second element 5' to the first element 4', which is done by means of a handling tool 10 (FIGS. 5c and 5d). The handling tool 10 is the same as disclosed above for the embodiment shown in FIGS. 1-4.

FIG. 5a-5d illustrates a sequence of steps for fastening the lining element(s) 1 to the supporting structure 2 according to one exemplary fastening method.

As a first step (FIG. 5a), the first element 4' is attached to the supporting structure 2 by means of the bolt 6 and nut 7. The first element 4' is hollow with an internal annular abutment surface (not shown), provided in the bottom section. The head of the bolt 6 bear against this abutment surface upon mounting to the supporting structure 2. Instead of using a separate bolt 6, it is also possible to provide the first element 4' with a threaded protrusion at a lower end thereof with which the first element 4 can be attached to the screen panel support 2 by a nut 7. The first element 4' may in that case have an axially arranged opening or may be solid.

Thereafter, as a second step (FIG. 5b), the lining element 1 to be fastened to the supporting structure 2 is placed on top of the first element 4' so that the though hole 8 of the lining element(s) 1 receives the first element 4'.

Finally, as a third step (FIGS. 5c-d), the second element 5' is screwed onto the first element 4' so that the inner threading of the second element 5' engages with the outer threading of the first element 4'. The handling tool 10 is used to rotate the second element 5' by engaging the protrusions 12 of the handling 10 with the grooves 9 of the second element 5' and thereafter rotate the shaft 11 of the handling tool 10. When the second element 5' is completely screwed onto the first element 4', the top portion of the second element 5' is aligned with the top surface of the lining element 1.

The lining element(s) 1 shown in FIGS. 2a-b, 3a-b and 5a-b have through holes 8 having a first circumference along a first portion 81 and a second circumference along second portion 82 of its axial extension. Furthermore, the second element 5' (embodiment shown in FIGS. 5a-b) and the first portion 51 of the second element 5 (embodiment shown in FIGS. 2a-b, 3a-b) have a smaller outer circumference than the first circumference of the through hole 8 and a larger outer circumference than the second circumference of the through hole 8. In other words, the through holes 8 are so called stepped holes. This feature allows for the second element 5' (embodiment shown in FIGS. 5a-b) and the first portion 51 of the second element 5 (embodiment shown in FIGS. 2a-b, 3a-b) to penetrate into the lining element(s) 1 and at least in part fill the volume defined by the first portion 81 of the through hole 8 having the first circumference.

Figure 5E:
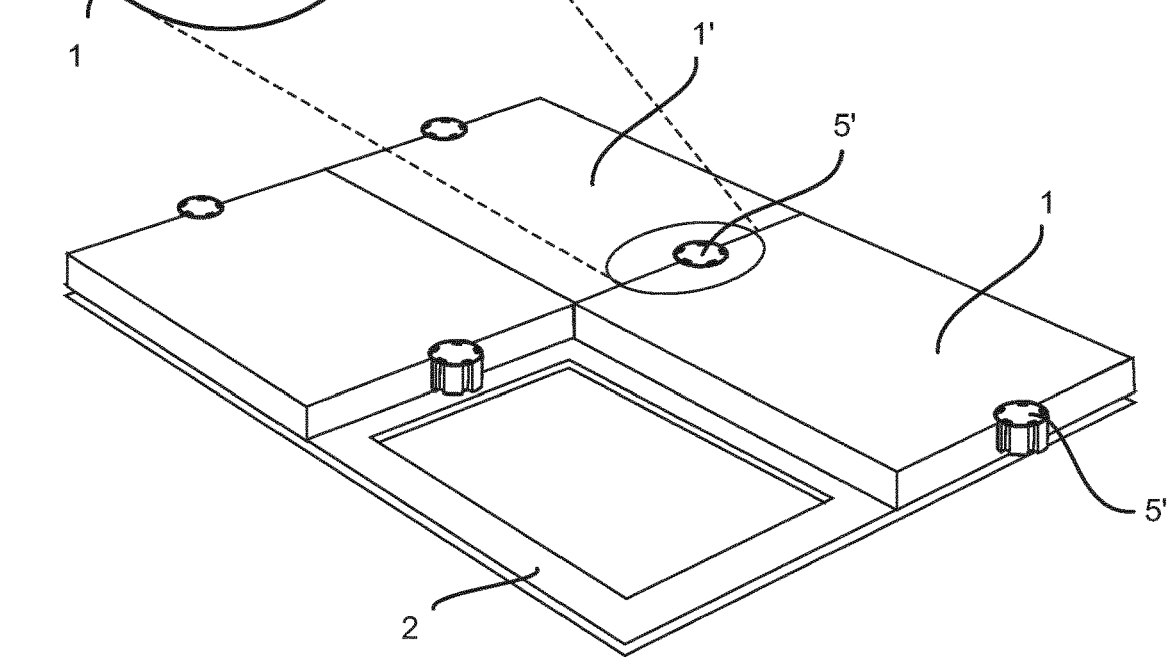
FIG. 5*e* shows a lining arrangement according to one embodiment.

In FIG. 5e, three lining elements 1 are fastened onto a grid support structure 2. As illustrated in FIGS. 5a-e, the through hole 8 is formed by circumference surfaces 16 of adjacent lining elements 1, 1' having shapes 8a, 8b which create at least one opening 8, said at least one opening 8 having a first circumference along a first portion of its axial direction and a second circumference along a second portion of its axial direction, said second circumference being smaller than said first circumference.

The skilled person realizes that a number of modifications of the embodiments described herein are possible without departing from the scope of the invention, which is defined in the appended claims.

For instance, the shape and size of the components described above may be varied in any suitable way. Specifically, the dimensions of the first portion of the second element 5, 5' may be chosen such as to correspond to a thickness of the lining element(s), thus allowing for better wear protection of the second element 5, 5'. The first element 4, 4' and the second element 5, 5' may have an annular shape as well as other shapes that is suitable for their purpose. The same applies for the inner threading, the outer threading and the grooves 8.

The inner and/or outer threading may be angled; one preferred angle could be approximately 45 degrees.

The groove 8 may extend along the entire length of the second element 5' or along a predetermined distance of the length of the second element 5' or extend along the entire length of the first portion 51 of the second element 5 or along a predetermined distance of the length of the second element 5.

The skilled person also realizes that the first element 4 can be fitted with the top portion in the form of a flange or similar below the screening module 1, i.e. directly on the screen panel support 2. In this case it is imaginable that the flange is arranged in a recess or similar arranged either in the screen panel support 2 and/or in the underside of the screening module 1 in order to create a flush contact surface between the screening module 1 and the screen panel support 2.

The device may comprise one or more further elements. For example, a clamping element having an axially arranged opening may be positioned between the first element 4, 4' and the second element 5, 5', such that the clamping element is pressed towards the support structure 2 upon interconnection between the first element 4; 4' and the second element 5; 5'. Thus, if the lining elements 1, 1' are disposed between the clamping element and the support structure 2, the clamping element may be used to clamp the lining elements 1, 1' towards the support structure 2. One example of such a clamping element is the fastening spider disclosed in WO 2007/008135 A1.

The invention claimed is:

1. A lining arrangement for wear protection comprising at least one lining element arranged to be fastened to a support structure, and at least one device, said device comprising:
   a first element adapted to be received in a through hole of said at least one lining element or a through hole created by adjacent lining elements, said through hole having a first circumference along a first portion of its axial direction and a second circumference along a second portion of its axial direction, said second circumference being smaller than said first circumference, whereby an abutment surface is formed in the transition between said first and second portion of said through hole;
   a second element for engagement with said first element, such that said at least one lining element is attached to said support structure upon interconnection between said first element and said second element;
   wherein the first element comprises a sleeve member having a flange with a radial extension arranged in a first end thereof, whereby a lower surface of said flange when the first element is received in the through hole rests on the abutment surface; and
   wherein the first element is configured to expand in a radial direction and lock the lining element in place on the support structure when the second element is screwed into the first element.

2. A lining arrangement according to claim 1, wherein said first element is manufactured in a flexible and deformable material, and preferably chosen from the group consisting of thermoplastic material or polyurethane or combinations thereof.

3. A lining arrangement according to claim 1, wherein said first element has slit openings arranged in a longitudinal extension in a second end opposite said first end.

4. A lining arrangement according to claim 2, wherein said first element has slit openings arranged in a longitudinal extension in a second end opposite said first end.

5. A lining arrangement according to claim 1, wherein said second element is manufactured of a material chosen from the group consisting of ceramic material, steel or rigid plastic.

6. A lining arrangement according to claim 1, wherein an outer periphery of a first portion of said second element comprises a plurality of grooves for engagement with a handling tool.

7. A lining arrangement according to claim 6, wherein said grooves extend in an axial direction and along at least a portion of the length of said second element.

8. A lining arrangement according to claim 6, wherein said grooves extend in an axial direction and along a limited portion of the length of said second element.

9. A lining arrangement according to claim 7, wherein said grooves extend in an axial direction and along a limited portion of the length of said second element.

10. A lining arrangement according to claim 1, wherein a second portion of the second element has an outer threading for engagement with an axially arranged opening of the first element.

11. A lining arrangement according to claim 1, wherein the flange of the first element is arranged in a recess arranged either in the support structure and/or in an underside of the at least one lining element.

12. A method for fastening lining elements to a support structure, comprising;
placing an opening of a lining element or an opening created by adjacent lining elements above a fastening position of a support structure, said opening having a first circumference along a first portion and a second circumference along a second portion of its axial direction, said second circumference being smaller than said first circumference, whereby an abutment surface is formed in the transition between said first and second portion of the opening;
engaging a first element with said support structure, said first element comprising a sleeve member having a flange with a radial extension arranged in a first end thereof, whereby a lower surface of said flange when the first element is received in the through hole rests on the abutment surface; and
engaging, by threading, a second element with said first element whereby the first element expands in the radial direction, thereby attaching said lining element or lining elements to said support structure.

13. The method according to claim 12, wherein the step of placing an opening of said lining element or an opening created by adjacent lining elements above a fastening position of said support structure is performed before engaging said first element with said support structure, and thereafter engaging the second element with said first element.

14. The method according to claim 12, wherein the step of engaging said first element with said support structure, is performed before placing an opening of said lining element or an opening created by adjacent lining elements above a fastening position of said support structure and thereafter engaging the second element with said first element.

* * * * *